(12) United States Patent
O'Brien et al.

(10) Patent No.: US 6,795,809 B2
(45) Date of Patent: Sep. 21, 2004

(54) METHOD AND APPARATUS FOR LOGGING SYSTEM TEST DATA IN A POS SYSTEM

(75) Inventors: Michael R. O'Brien, St. Petersburg, FL (US); George W. Off, Gulfport, FL (US); Timothy L. Cherney, Fullerton, CA (US); Gary M. Katz, Northbrook, IL (US)

(73) Assignee: Catalina Marketing International, Inc, St. Petersburg, FL (US)

(*) Notice: Subject to any disclaimer, the term of this patent is extended or adjusted under 35 U.S.C. 154(b) by 770 days.

(21) Appl. No.: 09/146,199

(22) Filed: Sep. 3, 1998

(65) Prior Publication Data

US 2002/0002485 A1 Jan. 3, 2002

Related U.S. Application Data

(63) Continuation of application No. 08/417,064, filed on Apr. 3, 1995, now Pat. No. 5,832,457, which is a continuation-in-part of application No. 08/088,617, filed on Jul. 6, 1993, now abandoned, which is a continuation of application No. 07/695,650, filed on May 6, 1991, now abandoned.

(51) Int. Cl.[7] .............................................. G06F 17/60
(52) U.S. Cl. ............................... 705/16; 705/1; 705/14; 705/17; 705/20
(58) Field of Search ............................... 705/8, 10, 14, 705/16, 18, 20, 21, 23, 33

(56) References Cited

U.S. PATENT DOCUMENTS

RE30,037 E * 6/1979 Bass ....................... 340/146.1
4,723,212 A * 2/1988 Mindrum et al. ........... 364/401
4,747,050 A * 5/1988 Brachtl et al. .............. 364/408
4,855,908 A * 8/1989 Shimoda et al. ............ 364/405
4,862,350 A * 8/1989 Orr et al. .................... 364/200
5,056,019 A * 10/1991 Schultz et al. .............. 364/405
5,208,742 A * 5/1993 Warn .......................... 364/131
5,256,863 A * 10/1993 Ferguson et al. ........... 235/383

FOREIGN PATENT DOCUMENTS

EP        0405909 A2 *  1/1991  ........... G06F/15/24

OTHER PUBLICATIONS

"Price Lookup: Systems Requirements and Potential Pitfalls", Quick Response News, v2, n8, pN/A, Apr. 16, 1990.*

* cited by examiner

Primary Examiner—James P. Trammell
Assistant Examiner—Calvin L Hewitt, II
(74) Attorney, Agent, or Firm—Neifeld IP Law, PC

(57) ABSTRACT

A system for automatically distributing discount coupons or certificates in a retail store, conditioned on a preselected combination of present and past shopping behavior of a customer whose order is being processed at a checkout stand. Generation of a printable discount coupon can be based on any desired combination of customer-supplied data, obtained from a customer identification data base, past shopping activity, derived from data gathered during previous customer visits to the store, and present shopping activity, as evidenced by items identified in the current customer order. Collection of data pertaining to past behavior of customers is facilitated by filtering all sales transaction data at the point of sale. If all of the preselected conditions for generation of a coupon are satisfied, the coupon is generated and printed at the checkout stand.

29 Claims, 8 Drawing Sheets

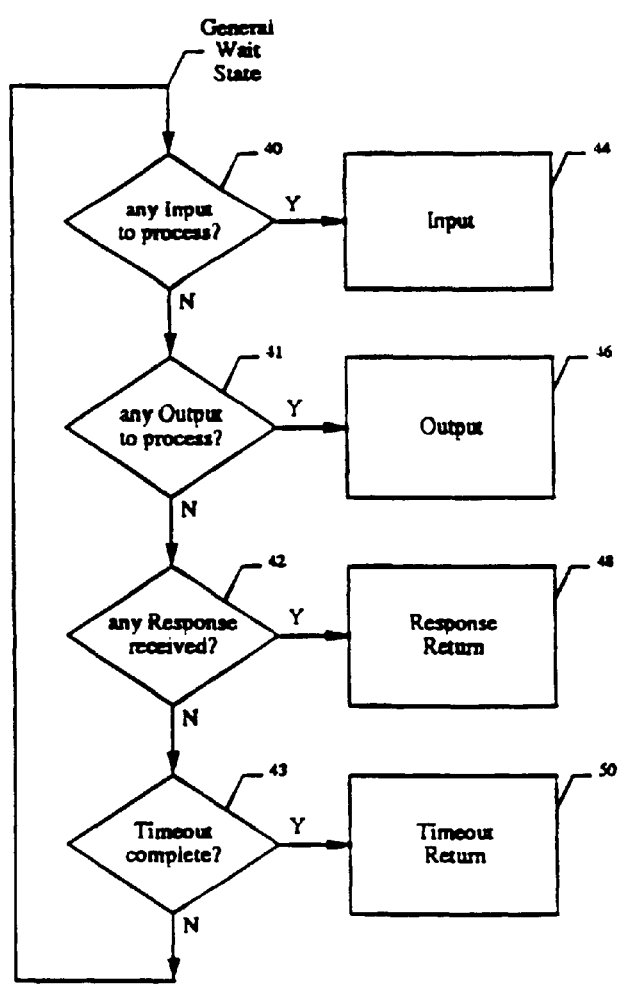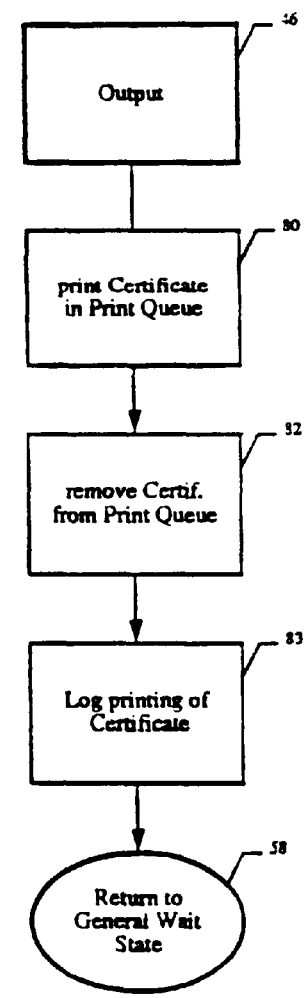
Fig. 2
Fig. 4

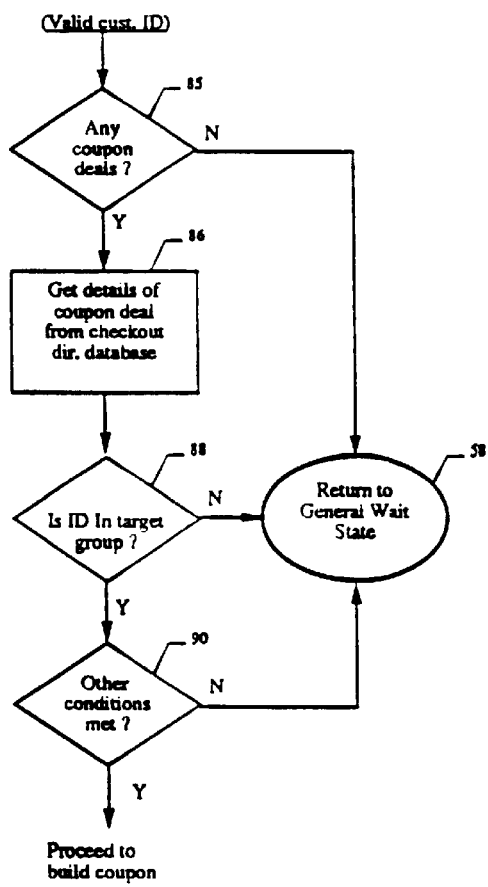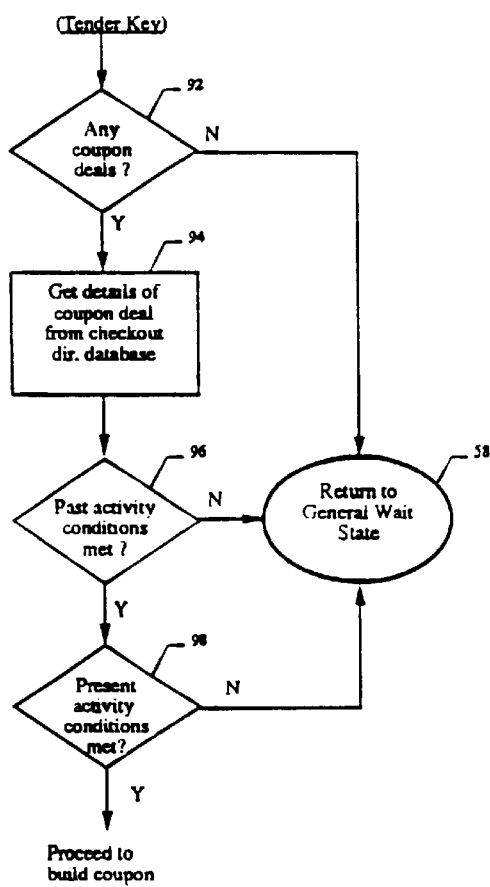

METHOD AND APPARATUS FOR LOGGING SYSTEM TEST DATA IN A POS SYSTEM

CROSS-REFERENCE TO RELATED APPLICATIONS

This application (claims priority under 35 USC 120 and) is a continuation of application Ser. No. 08/417,064, filed Apr. 3, 1995, now U.S. Pat. No. 5,832,487 which is a continuation-in-part of:

(1) application Ser. No. 08/088,617, filed Jul. 6, 1993, now abandoned, which is a continuation of application Ser. No. 07/695,650, filed May 6, 1991, now abandoned and (2) application Ser. No. 07/960,517, filed Oct. 9, 1992, now abandoned. The disclosures of the applications mentioned in this paragraph are hereby incorporated herein by reference as if fully set forth herein.

This application is related to application Ser. No. 07/465,478, filed Feb. 15, 1990, now U.S. Pat. No. 5,173,851, application Ser. No. 07/129,113, filed Dec. 4, 1987, now U.S. Pat. No. 4,910,672, and application Ser. No. 07/020,164, filed Feb. 27, 1987, now U.S. Pat. No. 4,723,212. The disclosures of these patents are incorporated herein by reference as if fully set forth herein.

BACKGROUND OF THE INVENTION

This invention relates generally to point-of-sale computer systems of the type used in retail stores to record sales transactions. More particularly, the invention relates to point-of-sale systems capable of handling discount coupons. Most point-of-sale systems have terminals that are capable of reading a code printed on each product package, and thereby determining the price from an internal file that is accessed by a store controller. Products are coded by means of a series of parallel lines, in accordance with a convention known as the Universal Product Code.

As every grocery shopper knows, many manufacturers distribute discount coupons for their products, either through the mail, or by printing them in newspapers or magazines, or enclosing them in similar or related product packages. When a customer presents a discount coupon at the time of purchase of an appropriate product, the grocery checker operating the terminal will typically key in the coupon amount, and the discount will be subtracted from the customer's bill.

This procedure often has the disadvantage that the customer may not have actually purchased the discountable product, and the coupon will then be improperly redeemed. A further disadvantage, from a customer standpoint, is that collecting coupons and taking them to the store is inconvenient, and many customers simply do not participate in any promotional program involving distributed coupons. This represents a significant loss for the manufacturers or retailers that distribute the coupons.

In the cross-referenced patent application that has issued as U.S. Pat. No. 5,173,851, and in related U.S. Pat. Nos. 4,910,672 and 4,723,212, systems are disclosed for generating printable discount coupons at a checkout counter, as a result of the purchase of one or more "triggering" products. A customer may then be presented with a discount coupon for use on a subsequent visit. This technique has proved to be very successful in distributing single discount coupons in response to the purchase of selected products or groups of products, but does not address other important marketing goals of retailers.

Retailers and manufacturers of grocery items and other consumer products have long felt a need for marketing and promotional programs that were more selective in targeting customers for attention. Most promotional programs involving product discounts require the distribution of coupons to large numbers of people, most of whom do not take advantage of the discounts offered. An important goal in promotional programs is to increase the percentage of redemptions of discount coupons, but this goal can only be achieved if alternative schemes are devised to target the promotional programs more selectively than has been possible in the past. Printing discount coupons in the store has already proved to be a key feature of such programs, and printing coupons in response to the purchase of triggering items is one specific technique for customer targeting. What is still needed, however, is a more general technique for targeting customers to receive details of promotional programs, based on more than simply a single triggering purchase.

Another aspect of this invention relates generally to point-of-sale (POS) computer systems and, more particularly to difficulties associated with the processing of point-of-sale data. Point-of-sale computer systems are widely used in retail stores to record sales transactions. These systems have varying levels of complexity and local storage capacity, but have in common the ability to record data relating to each of many sales transactions that take place in a store.

The primary purpose of a point-of-sale system is to provide a record of the accumulated sales transactions in a store. From the record, store management personnel can track sales volume and revenues by store, by department, by product category, or even by product, since each product sold is entered into the record by product code. A familiar bar code known as the universal product code (UPC) is scanned at a checkout stand, or entered manually if the code is missing or unreadable.

A secondary purpose of a point-of-sale system is to provide additional information computed from the primary record. For example, a common problem is controlling inventory levels to meet customer demand. Theoretically, the point-of-sale record contains all the information needed to enable management personnel to decide how much of any given product needs to be reordered to maintain store inventory at a desired level. A related problem is shelf space allocation in retail stores. Typically, shelf allocation is based on product sales. If a product sells well, more shelf space should be allocated to it in the store, to minimize the possibility of low or empty shelves.

Another category of secondary information contained within the primary point-of-sale record is concerned with research into customer behavior. This includes research into mass customer behavior, such as determining the number of customers who bought a specific product that was the subject of a promotion program, and research into individual customer behavior, such as determining whether a customer should be given a discount coupon for a product, based in part on the customer's present or prior purchase activity.

Although these secondary uses of point-of-sale data hold promise for store owners and managers, in fact there has been very little exploitation of point-of-sale data for other than the primary purpose of tracking sales volume and revenues of the store. The principal reason is that large point-of-sale systems simply provide too much data for many practical purposes. Inventory control is still usually handled by placing a fixed weekly or other periodic order with product vendors, and occasionally modifying the order based on long-term trends in inventory levels and any anticipated peaks in demand. Shelf allocation is usually handled more or less intuitively, or using out-of-date product sales information that is eventually derived from the point-of-sale data. Using point-of-sale data for consumer research is also rendered difficult by the large volume of data that has to be analyzed to obtain the desired information.

It will be appreciated from the foregoing that a serious problem faces store owners and managers who wish to use point-of-sale data for such applications as inventory control, shelf allocation control, and various forms of consumer research. The volume of collected data is so great that efficient processing for applications such as these has not been realized. The present invention provides a solution to this problem and the other problems alluded to above.

SUMMARY OF THE INVENTION

The present invention resides in a method and apparatus for generating printable discount coupons in a retail store, conditioned on some preselected combination of customer attributes and past and present customer shopping activities. In terms of apparatus, the invention comprises a plurality of terminals at customer checkout locations, each having means for reading product codes on purchased items in a customer order; means for filtering sales transaction data obtained at each terminal; a store controller with which the terminals can communicate, the store controller having access to an item record file containing price and other information for each product item; means for storing the terms and conditions of discount deals for which a customer may qualify; and means for uniquely identifying each customer, but only if preselected conditions relating to customers have been met by the specific customer whose order is being processed.

The apparatus may also include means for printing the discount coupon for immediate customer distribution. Further, the apparatus may include means for processing redemption of a printed discount coupon in a subsequent customer order, and applying a discount to the subsequent customer order if the discounted item is purchased, and means for maintaining a log of discount coupons printed and cumulative discount coupons redeemed.

More specifically, the apparatus of the invention further comprises means for identifying triggering products in the customer order, wherein each triggering product pertains to a condition of a coupon deal presently in effect or to be put into effect in the future; and customer purchase file means for storing data pertaining to the customer's purchase of triggering products, for use in determining whether future coupon deals should be effective. The means for automatically generating a printable discount coupon includes means for determining from the customer purchase file whether the customer has met all of the coupon deal conditions pertaining to past customer activity, and means for determining from the customer purchase file whether the customer has met all of the coupon deal conditions pertaining to present customer activity. A printable coupon will be generated only if the customer has met all of the required past and present customer activity requirements. These activity requirements may be selected as desired for a particular coupon deal. For example, a coupon may be generated if the customer has purchased a certain item in a specified time interval, but has not purchased a specific item in the present order.

In one form of the invention, the only condition to be satisfied before generating a coupon is that the customer is in a preselected target group of customers, which may be specified by factors such as age, residence location or income level.

In terms of a method, the invention comprises the steps of storing the terms and conditions of at least one discount coupon deal; uniquely identifying the customer whose order is being processed; determining whether the identified customer has satisfied all of the conditions of a discount coupon deal; and automatically generating a printable discount coupon if the conditions are satisfied.

In one form of the invention, the step of determining whether the identified customer has satisfied all of the conditions of the discount coupon deal includes determining whether the customer falls within a preselected target group of customers, based on information previously provided by the customer. In another form of the invention, the step of determining whether the identified customer has satisfied all of the conditions of the discount coupon deal includes determining whether the customer's past and present shopping activity satisfies preselected conditions.

More specifically, the method further comprises the steps of preselecting triggering products, each of which pertains to a condition of a discount deal presently in effect or to be put into effect later, detecting the purchase of triggering products in the customer order, and saving customer purchase data concerning the purchase of triggering products. The step of determining whether the customer's past and present shopping activity satisfies preselected conditions includes reviewing the customer purchase data saved in previous visits to the store.

It will be appreciated from the foregoing that the present invention represents a significant advance in the field of point-of-sale systems in which discount coupons can be printed in retail stores. In particular, the invention provides for very specific targeting of customers for promotional discount coupons, based on a selected combination of customer-supplied information, and present and past shopping activity by the customer. Other aspects and advantages of the invention will become apparent from the following more detailed description, taken in conjunction with the accompanying drawings.

BRIEF DESCRIPTION OF THE DRAWINGS

FIG. 2 is a flowchart showing the functions performed in a general wait state processing loop, in accordance with the method of the invention;

FIGS. 3*a* and 3*b* are flowcharts showing more detail of decision blocks 72' and 72 of FIG. 3;

FIG. 4 is a flowchart showing the functions performed in processing output data in accordance with the method of the invention;

DESCRIPTION OF THE PREFERRED EMBODIMENT

Figure 1:
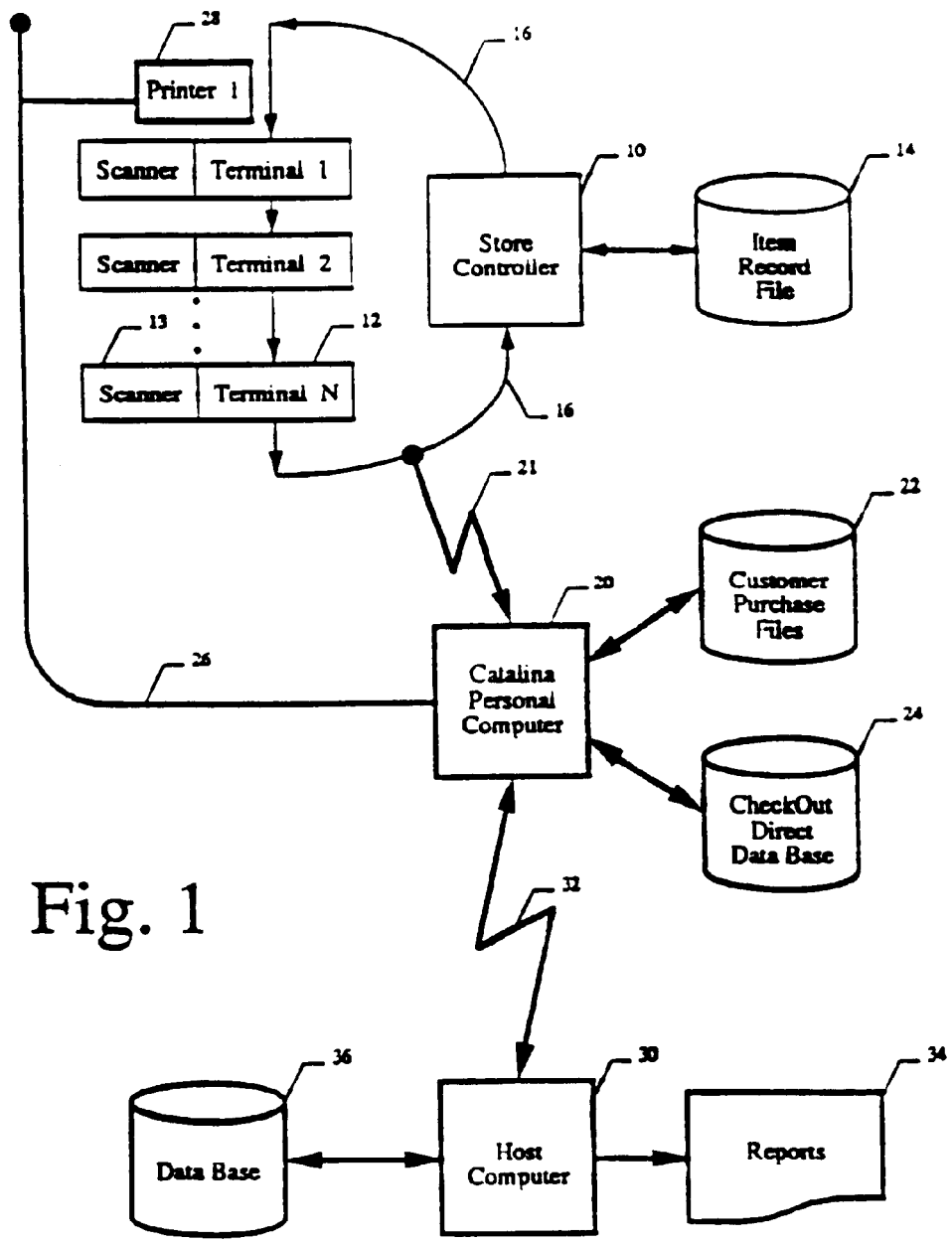
FIG. 1 is a simplified block diagram showing the apparatus of a point-of-sale computer system incorporating the present invention for use in a retail store.

Overview:

As shown in the drawings for purposes of illustration, the present invention is concerned with point-of-sale systems for recording sales transactions involving discount coupons or certificates. FIG. 1 shows in broad outline the components of such a system. In each store in which the invention is to be used, there is a store point-of-sale controller, indicated by reference numeral 10, and a plurality of checkout terminals 12, each having an associated optical scanner 13. Associated with the store controller 10 are a number of files, one of which is an item record file, indicated at 14, and these files are used by the controller to provide information to the terminals 12. The item record file 14 contains a record for each product sold in the store, and is used to access price and other information concerning the product.

In a typical store installation, the terminals 12 and the store controller are connected together in ring bus configuration, known as the terminal processing loop, indicated at 16. Communication between the store controller 10 and the terminals 12 is made over the terminal processing loop 16.

The components described thus far, including the store controller 10, the terminals 12, the item record file 14, and the terminal processing loop 16, together constitute a conventional retail point-of-sale system. In accordance with the invention, transactions taking place at the terminals are monitored to detect the sale of preselected triggering products, and printable cumulative discount certificates are generated as required. The invention is implemented principally in software form in a personal computer 20, which is coupled to the terminal processing loop 16, as indicated by line 21, in such a manner that the personal computer appears to the store controller 10 to be another terminal.

The item record file 14 is a standard price file used in point-of-sale systems, except that it includes a trigger flag, which is an additional one bit field. The record format of this file is shown in more detail in the cross-referenced patent application. In the process of coupon creation, the file 14 is accessed to determine if a product being purchased is a triggering product. If so, a corresponding record is retrieved from the checkout direct data base 24. This provides additional information about the discount deal that is in effect for this particular product, specifically the amount of the discount. Discount coupons may be printed as a result of purchase of a triggering item, as in the systems described in U.S. Pat. Nos. 4,910,672 and 4,723,212, or may be printed without the purchase of a triggering item, if the customer is targeted for a specific promotional program, as will be described in this specification.

Associated with the personal computer 20 are two file systems: a customer purchase file 22 and another database file 24 referred to as the checkout direct database. In operation, the personal computer 20 detects the purchase of triggering products at the terminals 12, retrieves the terms of each discount deal from the checkout direct database 24, builds a list of triggering products, and at the end of the customer transaction updates the customer purchase filed with the items in the list. The customer purchase file is interrogated to determine if any checkout direct coupons are to be printed. The personal computer 20 also controls printing of the cumulative discount certificates. through a printer output bus 26, which is connected to a printer at each terminal 12, one of the printers being shown at 28.

The personal computer 20 is also coupled to a retailer host computer 30, as indicated by line 32, which may be a telephone line or some other communication link. The retailer host computer 30 controls communications with all store controllers in the retailer's various stores, and is responsible for generating various accounting reports, as indicated at 34. The retailer host computer 30 has an associated data base 36 of various files relating to the retailer's entire store operations.

In accordance with the invention, the personal computer 20 keeps track of selected features of each customer's purchase history, in the customer purchase files 22, and the printing of coupons is conditioned on some desired combination of past history and current purchase behavior. Coupon printing may also be conditioned on demographic factors. Thus, a list of valid customers may be subject to demographic filtering either in the personal computer, or in off-line device (not shown), which provides a filtered list of customer identifiers to the personal computer. For example, a promotional program may be limited to customers in a certain age group, geographical area, or income range.

Conditioning the distribution of a coupon or certificate on past purchase behavior opens up some interesting marketing options for the retailer and manufacturer. For example, a coupon for hair shampoo can be printed some preselected time after a prior purchase of the same product, or even a different product, to provide the customer an opportunity to buy the discounted product at a time when his prior purchase has been almost completely used. Another possibility is to target households based on the categories or brand names that have been purchased over a period of time.

In general, past customer behavior data utilized in the invention can be either derived from existing data bases, or gathered by the apparatus of the invention. Retailers that have customer identification cards in place are already able to analyze customer behavior in terms of departmental sales records, shopping frequency and order size over a period of time. Based on these factors, a retailer could provide a customer target list for a specific promotional program. For example, if a store were to open a new delicatessen department, it could later identify those customers who had not used it, and target them for a special discount promotion. The other level at which customer behavior data may be employed involves the collection of the behavior data as well as its use. Sales for a selected category of items, or for multiple categories of items, are monitored over a period of time, perhaps several months, and the results are accumulated in the customer purchase files 22. A promotional program can then use the data in these files to identify and target customers whose past shopping behavior in the selected category meets some desired criterion. For example, in a promotional program that distributes discount coupons for a particular brand of coffee, the targets could be customers who have purchased some other brand in the last several months. Another promotion might be used to reward customers whose shopping behavior demonstrates loyalty to a particular brand of a product.

In all of the cases and examples described above, the distribution of discount coupons or certificates may also be conditioned on a customer's present behavior, as determined by the size and nature of the customer's present transaction at the store. A condition for printing a coupon may be the size of the order, the purchase of a particular item, or the purchase of a particular size or quantity of an item.

Certificate Creation and Redemption:

The coupon creation functions performed by the apparatus of the invention are shown in FIGS. 2, 3, 3a, 3b and 4. FIG. 2 illustrates a "general wait state" of processing performed in the personal computer 20, which involves cyclic checking to determine whether any specific processing task needs to be performed. Once processing is initiated to a certain stage, a return is made to the general wait state, as will be further explained. For purposes of explanation, the processing steps performed by the invention are depicted as involving a transaction at a single terminal. It will be understood, however, that the personal computer 20 provides effectively simultaneous processing for all of the terminals 12, but to illustrate processing for multiple terminals would render the flowcharts unduly complicated.

The general wait state processing loop shown in FIG. 2 includes a series of four decision blocks 40–43. In block 40, the computer 20 determines whether there is any input data to process. Input data is either from a terminal bar code scanner (not shown), or from a terminal keyboard (not shown). If there is input to process, the computer 20 enters an input processing sequence, shown at 44 and, in more detail, in FIG. 3. In block 41, the computer determines whether there is any output to process. If so, an output processing sequence is entered, as indicated at block 46 and, in more detail, in FIG. 4.

Block 42 in the general wait state processing loop determines whether any response has been received from a prior request made to the controller 10 for file access. As will become apparent, the computer 20 makes a number of requests for file access but, because gaining access to a file may take a relatively long time, processing continues in the general wait state loop until a response to the request is received. Then a response return is made, as indicated at 48, which simply means that control is transferred back to a point in the program at which the file access request was made, so that the program can continue in its proper sequence. Finally, decision block 43 in the general wait state loop determines whether a time-out is complete. In some point-of-sale systems, printing of cumulative discount certificates may be accomplished without a completely separate printer for that purpose. There may be a separate print station for printing the certificates, but the print head may be shared by other printing functions, such as customer receipt printing. In this case, it may be necessary to avoid having the printing of so many discount certificates (and possibly other types of discount coupons) that other printing functions are precluded. Therefore, the printing of a discount certificate, or of a substantial part of the certificate, can be followed by a request for a time-out, to allow other printing functions to gain access to the printer. Until the time-out is complete, as determined in block 43, processing remains in the general wait state loop. When the time-out is complete, a time-out return is made, as indicated in block 50, to continue processing at the point from which the time-out was requested.

The present invention performs a variety of functions in connection with selective printing of discount coupons or certificates, all of which require no active customer participation except in the sense that each customer must be uniquely identifiable in some way. Currently, the most common way of identifying customers is by means of an identification card issued by a retailer. Customers are encouraged to obtain identification cards to facilitate payment by personal check, but the cards also provide the means for associating customer behavior with a unique customer or household. In this specification, the identification card (ID card) is described as the tool used for making this association. Typically, the customer ID card has a unique identifying number encoded on it using bar codes or a magnetic stripe, either of which can be conveniently read at the checkout counter. However, it will be understood that other means for customer identification are possible and also fall within the scope of this invention. For example, customers may be identified by a machine-readable driver's license, or a bank card, or even by means of fingerprint scanning, if the technology for doing so becomes available at reasonable cost.

Figure 3:
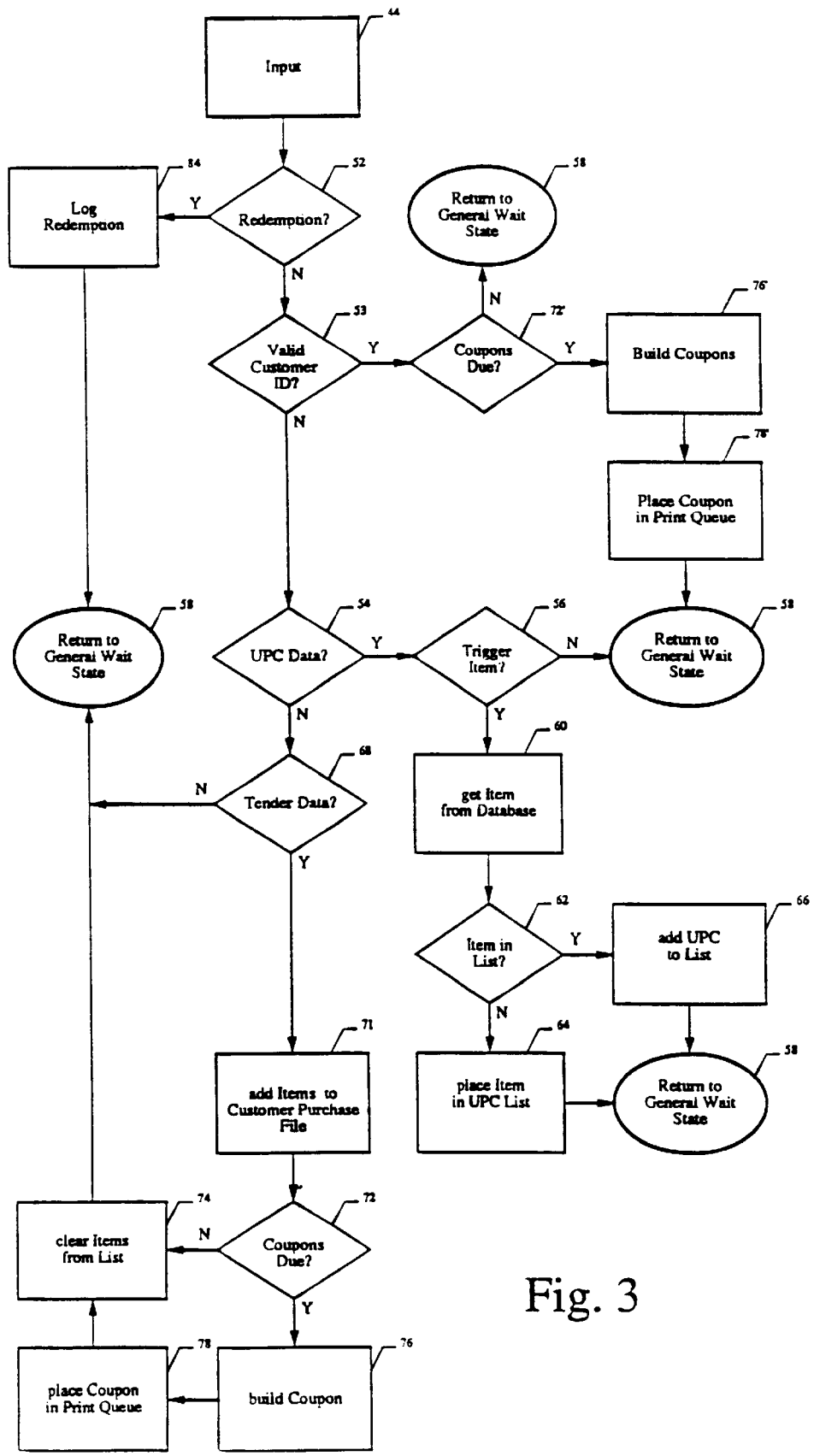
FIG. 3 is a flowchart showing the functions performed in processing input data and generating printable discount certificates in accordance with the method of the invention.

FIG. 3 shows the input processing sequence 44 in more detail. First, in block 52, the input data is examined to determine whether it is redemption data. Each printed discount certificate will have a special bar code that can be read at the checkout counter, and distinguished from the Uniform Product Codes that identify products, and from other codes on customer ID cards. If the input is not redemption data, it is checked, in block 53, to determine if it is a valid customer ID. If the input is not redemption data and is not a valid customer ID, it is next checked, in block 54, to determine if it is Uniform Product Code (UPC) data. If so, a record corresponding to the UPC in the input data is retrieved from the item record file 14 (FIG. 1), and is checked to determine whether the item is one that should trigger the generation of a cumulative discount certificate, as indicated in block 56. If the item is not one that has been preselected to trigger generation of a certificate, no further processing is needed for this item and a return is made to the general wait state, as indicated at 58. If the item is a triggering item, a corresponding record is retrieved from the checkout direct data base 24 (FIG. 1), as indicated in block 60. The succeeding processing steps generate a selective UPC list for the customer order presently being processed. The list contains only triggering items purchased by the customer. For purposes of this invention, a triggering item is defined as any item that has an effect on the terms of a discount deal. For example, purchase of a triggering item may be the sole criterion for initiating printing of a discount coupon; or purchase of one or more triggering items may be a condition that qualifies the customer for a discount coupon for which he has qualified by reason of some past shopping activity. If the item being processed is not already in the list, as determined in decision block 62, it is placed in the list, as indicated in block 64. If the item is already in the list, the number of purchases of this item is incremented, as indicated in block 66, and a return is made to the general wait state processing loop, as indicated at 58. Repeated processing of data corresponding to purchased items, in blocks 54 through 66, results in the generation of a UPC list of triggering items, which may result in the printing of a coupon or certificate. This list is stored internally in the computer 20 until the end of the customer transaction, as indicated by the "tender" state of the checkout keyboard.

When the customer tenders payment for the order, the operator actuates a "tender" key to terminate the transaction and open a cash drawer at the checkout counter. The actuation of the tender key is detected as indicated in decision block 68. Prior to actuation of the key, processing proceeds from block 68 to the general wait state loop, as indicated at 58. Once the tender key has been detected, the cumulative discount list is examined to determine if it contains any items. If the list contains one or more items, these items are added to the customer purchase file, as indicated in block 71. This is the principal data gathering step, in which the purchases of triggering items are recorded for possible later analysis. In the most advanced form of the invention, everything the customer purchases may be a triggering item for which purchase data must be gathered for later use in targeting customers for specific promotional programs. Obviously, gathering purchase data on a "full basket" of items requires a very large storage capacity for the customer purchase files 22, but still employs the same principles described here. In a more practical embodiment of the invention, point-of-sale data are filtered immediately to reduce the volume of data that has to be stored in the customer purchase files 22. The specific filtering technique employed in the preferred embodiment is discussed below.

After updating the customer purchase files, a decision is made as to whether any discount coupons or certificates should be printed, as indicated in block 72. This decision is based on both current and prior purchases, which are stored in the customer purchase file, and is further explained with reference to FIG. 3b. If the criteria have not been met, the UPC list for the transaction is cleared, as indicated in block 74, and return is made to the general wait state processing loop, via block 58. If the desired criteria are met, as determined in decision block 72, the appropriate checkout direct coupons are generated, as indicated in block 76, and is placed in a print queue, as indicated in block 78, before clearing the list (block 74) and returning to the general wait state loop via block 58.

A related aspect of the invention is the generation of printable coupons or certificates in response to the detection of a valid customer ID, in block 53. Some coupon deals do not require the use of data relating to the current customer transaction, and can therefore be processed as soon as the customer ID is detected, in block 53. A decision is made in block 72' whether any coupons are to be generated for this customer. If so, the coupons are generated, as indicated in block 76', and placed in the print queue, as indicated in block 78'. Otherwise a return is made directly to the wait state, as indicated at 58.

Printing the coupons or certificates is accomplished with the steps of output processing 46, as shown in more detail in FIG. 4. Basically, output processing involves three steps: printing a certificate from the print queue, as indicated in block 80, removing from the print queue an entry corresponding to the printed certificate (block 82), and logging the printing of the certificate (block 83) in the cumulative discount certificate log files 22 (FIG. 1). Then a return is made to the general wait state processing loop, via block 58. If other certificates remain to be printed, they will be retrieved from the print queue on a subsequent return to these output processing steps.

The only general aspect of the invention not yet discussed is certificate redemption. Each printed cumulative discount certificate is redeemable on a subsequent visit to the store. When the certificate is presented, the checkout counter operator scans a bar code on the certificate and this action generates input data to the personal computer 20 (FIG. 1). Input data relating to redemption is recognized, as indicated in decision block 52 (FIG. 3), and the redemption is logged, as indicated in block 84 of FIG. 3. Logging redemptions involves two basic functions: maintaining a cumulative record of certificates that have been redeemed, in the files 22 (FIG. 1), and applying the discount to the customer order.

Conditioning of Coupon Generation:

As indicated in the description of FIG. 3, a decision whether or not to generate a printable discount coupon or certificate is made at either or both of two stages in the processing of input data. One of these stages, indicated at block 72', is at the point at which a valid customer ID has been recognized but details of the present transaction are not considered in the decision. The other stage, indicated at block 72, occurs after the checkout counter clerk has actuated the tender key at the end of the customer transaction. More detailed processing of the decisions at 72' and 72 are depicted in FIGS. 3a and 3b, respectively.

As shown at block 85 in FIG. 3a, the first question posed in the coupon generation decision process is whether any coupon deals are presently in effect. If not, there is an immediate return to the general wait state 58. If so, the details of the coupon deals are retrieved from the checkout direct data base 24, as indicated at 86. Basically, these details define the terms and conditions of each coupon deal, including the item, items, or product category to which the discount applies, the effective dates of the discount, and the qualifying conditions. One of the qualifying conditions may be that the customer ID must fall within a targeted group of customers. Thus, the next question posed in the processing, at block 88, is whether the current customer ID falls within the targeted group for this particular discount coupon deal. The checkout direct data base 24 may contain a list of customer IDs for the coupon deal, or may instead contain a reference to another database file that contains the list. In any event, the decision process requires that the current customer ID be within the targeted group. The group may be selected for any desired single demographic attribute, or some combination of attributes, such as age, residence location, income level, number of children, and so forth. If the customer ID is not one of those targeted, exit is made to the general wait state and no coupon is generated.

If a customer ID is one of those targeted, other conditions may still have to be satisfied before a coupon is generated, and these conditions are tested in block 90. For some coupon deals, there may be no further condition to satisfy. For example, there may be a onetime discount deal to generate a coupon for a vitamin supplement for every customer over 60 years of age. However, other discount deals may be conditioned on prior customer behavior, as recorded in the customer purchase files 22. For example, a deal may con- ditioned on the customer's having purchased some mini- mum dollar total of products over the past month, or on the customer's having not purchased some item from a specified department of the store in the past month. If the additional conditions are not met, exit is made to the general wait state. Otherwise, processing continues with the generation of a printable discount coupon or certificate.

Processing of the decision of block 72 (FIG. 3) proceeds in a similar fashion, as depicted in FIG. 3b. The first question posed is whether there are any coupon deals in effect (block 92). If so, the details of the deals are retrieved from the checkout data base 24; if not, exit is made to the general wait state. At this point in processing, no further attention is paid to the customer ID, although this could also be a factor if desired. Basically, there are two broad tests to be satisfied before a decision is made to generate a printable coupon. The first test, in block 96, is to determine whether any designated past activity conditions have been met, and the second test, in block 98, is to determine whether any present activity conditions have been met. If both tests are passed, an appropriate printable coupon is generated; otherwise a return is made to the general wait state.

The past activity conditions may be anything for which information is available in the customer purchase files. For example, a discount deal may be conditioned on the cus- tomer's previous purchase of a particular product within a specified time frame. More particularly, there may be a discount for toothpaste if the customer bought toothpaste a month earlier, and may be near to running out of the same product. Such a deal may be further conditioned on the customer's not purchasing toothpaste in the present transaction, or on any desired combination of present pur- chases. Basically, the past activity test may involve any customer behavior that includes a time element. A further example is any condition relating to the frequency of pur- chase of certain items, or categories of items. Present activity conditions may be any desired combination of items purchased or not purchased, or a dollar amount threshold.

Each coupon deal may be designed for any desired objective, such as to reward brand loyalty by printing a discount when the customer buys selected products, or to encourage purchases in a specific department of the store, or to provide a timely discount when a product is likely to be needed by the customer.

Hardware and Software Overview:

As mentioned earlier, the computer 20 is a personal computer, utilizing a microprocessor chip such as the Intel 80386. Software for performing the functions described above may run under a conventional operating system for such a computer, such as the Microsoft Disk Operating System (MSDOS). The functions described can be programmed in any desired manner or language. However, for completeness, a source language listing of a set of programs for performing the functions described is contained in Appendix A to this application.

Some details of the software will be dependent on the point-of-sale hardware with which the software must interface in obtaining data from the terminal processing loop (16, FIG. 1). Distinctly different interface programs will be needed to adapt the invention of operation with either IBM, Datachecker, NCR or Sweda point-of-sale systems, but the specification of these interfaces are design details not critical to the invention.

Figure 5:
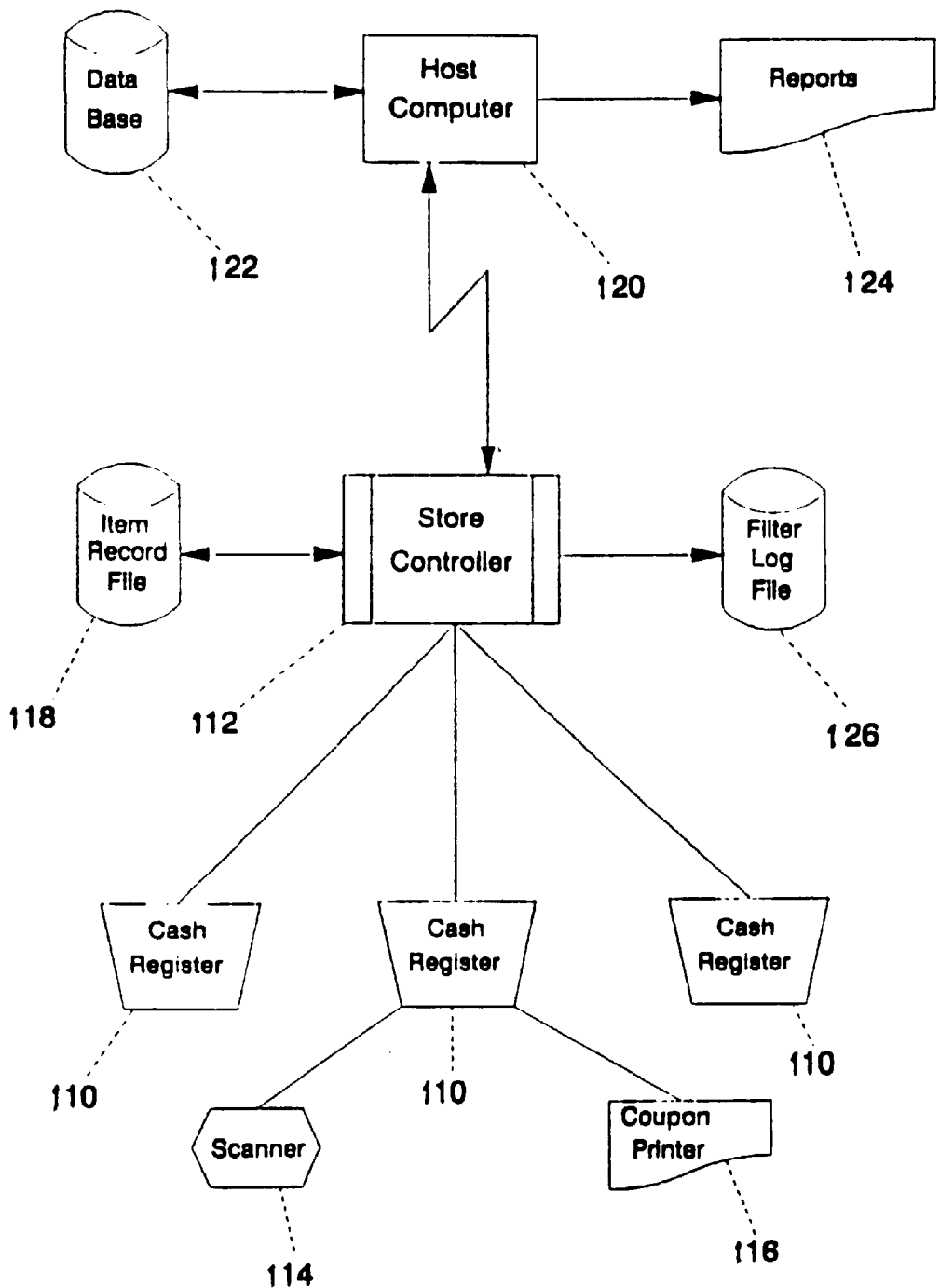
FIG. 5 is a block diagram illustrating the principal hardware components of a point-of-sale system in which the invention is used.

Filtering Data at the Point-of-Sale:

FIG. 5 shows the principal hardware components of a point-of-sale system, including multiple cash registers, indicated by reference numeral 110, connected to a store controller 112. Each cash register has a scanner 114, and may have a coupon printer 116 for printing discount coupons at the checkout register. The store controller 112 has access to a number of computer files, one of which is an item record file 118, which contains a record for every item sold in the store. In the item record file 118, every item is identified by its Uniform Product Code (UPC), its price, and various other data fields relating to the item.

In large retail stores, the store controller 112 is linked to a host computer 120, usually at a remote site. Data records captured at the cash registers 110 are transmitted to the host computer 120, for further processing in conjunction with a data base 122, and various reports 124 are generated by the host computer. As will be further explained, the store controller 112 of the invention also has a related filter log file 126, in which filtered data items are stored.

Figure 6:
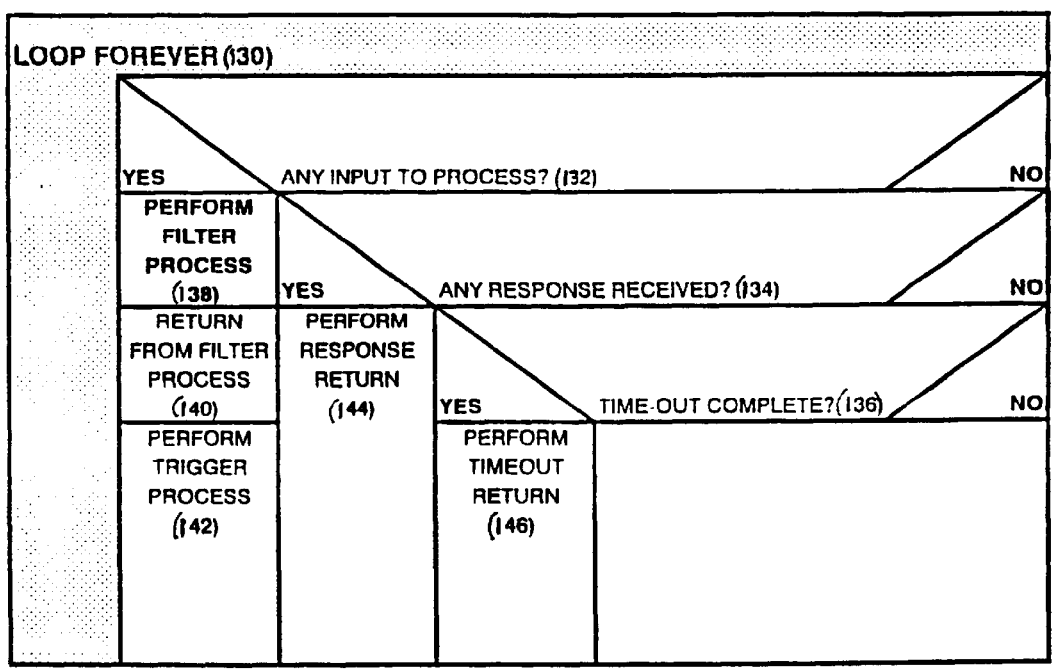
FIG. 6 is diagram showing the principal functions performed by the point-of-sale system, including a filter process used in the present invention.
Figure 7:
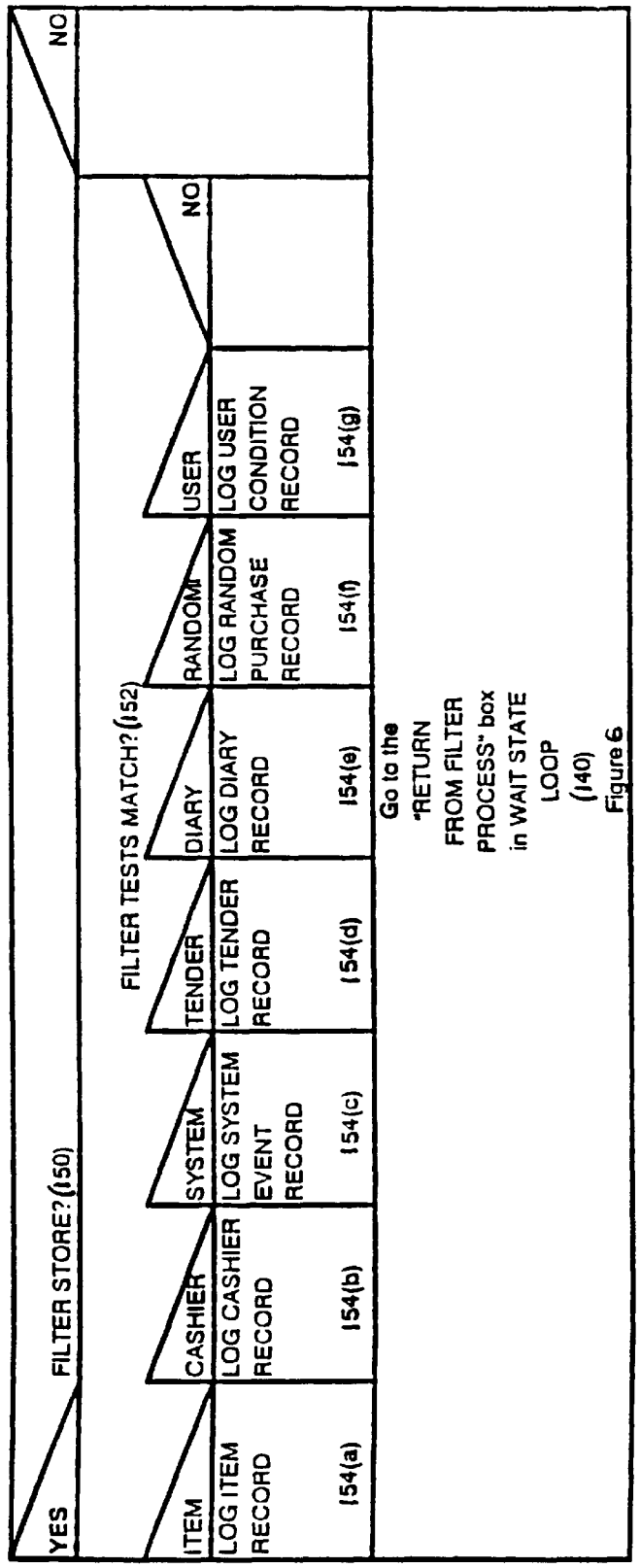
FIG. 7 is diagram showing the functions performed by the filter process referred to in FIG. 6.

FIG. 6 is a simplified depiction of the functions performed in a wait-state loop of the point-of-sale system of the invention. FIGS. 6 and 7 both utilize a charting method used in structured system development and known in the data processing industry as either "Nassi-Sniderman" charts or "Chapen" charts. Charts of this type contain the same information as conventional flowcharts, but are believed to eliminate redundant, inconsistent and incomplete logic within programs. The conventions employed in these charts are relatively simple. Each chart is read serially from top to bottom. A binary condition is represented by a question stated in a block of the chart, with a "yes" or "no" response indicated at opposing sides of the block, separated from the main body of the block by a diagonal line. The "yes" or "no" path from the binary condition block can be found by simply following the "yes" or "no" portion of the block to the next adjacent block. The chart differs from a conventional flowchart in that function blocks are not separated by "paths" but are placed in adjoining relationship to indicate the direction of logic flow.

The wait-state loop shown in FIG. 5 has an outer frame 130 that carries the implication that the functions within the frame are performed repeatedly in an infinite processing loop. Basically, the loop poses three questions. In block 132, the system checks to determine if there is any input to process; in block 134 the system checks to determine if a response has been received; and in block 136 the system checks to determine if a time-out is complete. If the answer to any of these questions is "no," as indicated in the right-hand side of the respective blocks, processing continues with the next question in sequence and, after the last block 136, processing returns to the first block 132 again.

If there is input to process, this is the function of the present invention, and a filter process is performed, as indicated at 138, and as further explained with reference to FIG. 3. After return from the filter process, indicated at 140, the system may also perform a trigger process, indicated at 142, to determine if a product that is the subject of a current transaction is a "trigger product" for which some special action needs to be taken. A trigger product is a preselected product involved in a store promotion, which may require the printing of a discount coupon at the cash register.

If a response has been received, as determined in block 134, a response return process may have to be performed, as indicated at 144, and if a time-out is complete a time-out return will be performed, as indicated at 146. Processing of response returns time-out returns, and trigger products do not form part of the present invention, and are mentioned only for completeness.

The filter process of the invention, as shown in FIG. 7, includes a preliminary test to determine whether this is a store that is using the filter process, as indicated in block 150. This test permits a standardized system to be installed in all stores, but for the stores to activate the filter process selectively. If the store is not one employing the filter process, this is the end of filter processing and a return is made to the wait-state loop of FIG. 6. It should be noted that a block of the chart that is completely blank is a no-operation block, and the processing logic path continues through the block to next block immediately below the blank one.

If the store has the filter process activated, the next step in the process is to determine which, if any, of several filter tests match, as indicated in block 152. The filter process, when activated, is selected to filter data based on one or more testing criteria. The first, and perhaps most important, of these criteria is the item level test, based on the Uniform Product Code of the items being purchased. The item level test can be for a specific item, or for a group of items, such as all items supplied by a specific manufacturer, or all items in a specific category. The action taken if an item matches is to log an item record, as indicated in block 154(a). Other actions, for other types of tests, are described below and are indicated in blocks 154(b) through 154(g). If no tests match, return is made to the wait-state loop of FIG. 6.

The types of filter tests are as follows:

(a) Item test, based on the UPC of each item purchased. The UPC includes a manufacturer's code that can be used to filter the point-of-sale data to a specific manufacturer, or to a specific category of items, or to a specific item. Advantages of an item filter are discussed further below.

(b) Cashier test, allows logging of specific activities that occur during the sales process. These filters can be used to monitor security situations, such as voided transactions, over-rings, and manager overrides. They can also be used to collect data on operator performance or used to feed data to a time and attendance system.

(c) System test, allows the logging of specific system activities that can reflect on the performance of the store system, both human and computer. Events such as "loop errors" (the failure of a message to successfully flow from the cash register to the store controller), terminal reloads, and so forth, can be logged and monitored. Events such as a price change at the register, or item-not-on-file during check-out can be used as an audit of how well manual procedures are being performed by the retail organization.

(d) Tender test, allows the logging of events that occur during electronic tendering transactions. Specific response filters can be set to measure the performance of outside service providers, such as for check and credit authorization. For example, authorization time-outs and "call-center" for authorization have a direct impact on customer service. Another example is an "off-line" negative file built from the on-line "decline responses," i.e. responses for authorizations that are declined. Specific decline codes for a customer card number may be used to update such a negative file. If the in-store system is not able to communicate with the authorizer, it would be able to look at this negative file to determine if this card holder had ever been declined by an on-line transaction.

(e) Diary test, allows collection of information relating to an entire customer's purchase. This alignment of customer orders allows for later detailed "market basket" analysis of items purchased. The logging can be customer order summary information (i.e., number of items, department distribution, or class analysis), or it can be down to the detail item information level depending upon the type of analysis desired. This filter will also allow the sale of information to companies who perform "panel diary" studies based on customer purchase data. In this case, a customer identification number is also logged with detail item and tendering information.

In addition to the issuance of coupons, manufacturers sometimes distribute product samples to consumers to promote their products. Distribution can be made in stores, on street corners, or by mail, and can be best described as a costly and unfocused approach, from a marketing standpoint, since products may be given to people who are unlikely to want them or use them. A more focused approach is to use the present invention in conjunction with triggered coupons. When a consumer is identified from a panel diary study, or when a consumer with a frequent shopper identification makes purchases that identify the consumer as a candidate for target marketing, the consumer's name is added to a special mailing list for specific manufacturer samples. This filtered product sampling would provide greater exposure to the consumers most likely to purchase the product, at a lower cost.

(f) Random test, based on external parameters and not exclusively on data collected at the cash registers. For example data may be logged over a period determined by a random timer or customer counter that provides a statistically significant sample of customer sales activities. The limited data sample can then be used to help predict future sale activity.

(g) User condition test, defined by the store user to log data of specific interest. For example a store manager may be concerned about activity at a particular register or registers during a specific period, such as the activity of a patio register during a sidewalk sale, the activity of a specific cashier, or overall sales at all registers during specific time periods. This data would be logged and then processed by a subsequent reporting system.

Figure 8A:
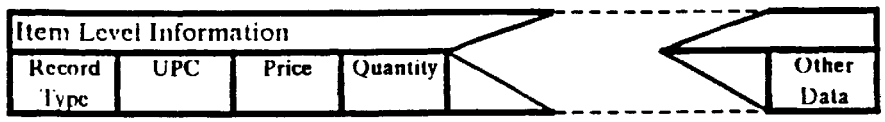
FIGS. 8(*a*) through 8(*g*) are a set of diagrams depicting examples of various log records that may be used in the system of the invention.
Figure 8B:
Figure 8C:
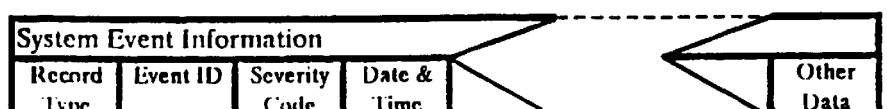
Figure 8D:
Figure 8E:
Figure 8F:
Figure 8G:
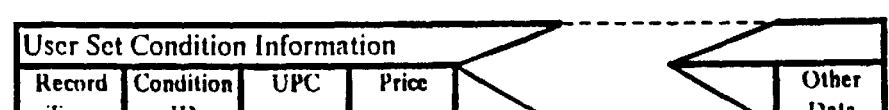

FIGS. 8(a)–4(g) are typical filter record log formats used in conjunction with the filter tests (a) through (g), respectively. For the item filter, the fields recorded may include the record type (to distinguish the record from those resulting from different filter types), the UPC of the item, the price of the item, and the quantity involved in the transaction. For the cashier activity filter, such data as the cashier identification, an activity indicator, and the date and time of the recorded event, are recorded in the log record. For the system event filter, the data recorded may include an event identifier, an error severity code, and a date and time. For the tendering activity filter, the data may include a tender type, a terminal identifier, and a date and time. For the consumer diary filter, a detailed form of the data may include a customer identifier, the UPC and the quantity purchased. A less detailed log record for the consumer diary may be based on numbers of items and a product type or department distribution, rather than on UPC for each item purchased. For the random test, the log record includes UPC, price and quantity data over the period of logging. Finally, for the user test, the log record includes a condition identifier, the UPC and the price.

The use of an item filter provides information on the movement of specific products that can support the buying or reordering process. The information can be used with a computer reorder system, or provided to a human responsible for buying, or provided to a vendor. A generalized filter allows the logging of all item movement level information, so that it can be analyzed later by another system. Some of the potential benefits of having this information are discussed below.

Timely information concerning the movement of specific products improves stock availability by giving the retailer or vendor a warning when on-hand stock levels are lower than the expected demand. Instead of operating on a fixed delivery schedule, the retailer can react quickly to changes in demand for selected products.

The related problem of shelf space allocation is also easier to handle if timely information on the sales of selected products is available to the retailer. Ideally, out-of-stock conditions can be eliminated for key selected items.

It has been estimated that over ten thousand new products are introduced each year in retail stores. Each new item typically has only a very short time in which to demonstrate its marketing viability. With appropriate item selections, filtered sales data allow manufacturers to obtain specific product performance, either alone or in conjunction with complementary products.

Sales data for specific items can also help the manufacture to monitor the progress of promotional product displays and the like. The item movement data would allow the manufacturer to determine whether or not a promotional display was built and, if built, the degree of its impact on product sales.

Filtering sales data by item also permits a manufacturer to perform a retail price point sensitivity analysis. This would encourage the establishment of retail prices that promote high manufacturer volume while improving retailer profitability.

It will be appreciated from the foregoing that this aspect of the present invention represents a significant improvement in techniques for capturing and using point-of-sale data. In particular, the invention provides for selectively filtering data at the point of sale, rather than collecting a large volume of data for later analysis.

Summary of Advantages:

The present invention facilitates the generation of printable discount coupons for a customer while in the store, but conditioned on a selected combination of present and past shopping activity of the customer. The conditions to be met before generating a coupon can range from simply falling within a preselected target group, by virtue of age, address, or other demographic factor, to any more complex combination of shopping activities, including prior purchases (or non-purchases) of selected items or categories of items, and present purchases. By filtering sales transaction data at the point-of-sale, the invention can track past customer performance efficiently without storing large volume of data.

It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. A point of sale system, comprising:
    (a) a terminal at a customer checkout location, said terminal having means for reading product codes on product items in a customer's order;
    (b) item record file means for storing price and product identification information for product items;
    (c) a store controller with which said terminal can communicate, said store controller in communication with said item record file; and
    (d) means for collecting and storing system test data, said system test data comprising a log of events including at least two of (1) loop error events, (2) terminal reload events, (3) price change at the terminal events, and (4) item-not-on-file events.

2. A point of sale system, comprising:
    (a) a terminal at a customer checkout location, said terminal having means for reading product codes on product items in a customer's order;
    (b) item record file means for storing price and product identification information for product items;
    (c) a store controller with which said terminal can communicate, said store controller in communication with said item record file; and
    (d) means for collecting and storing system test data, said system test data comprising a log of events including at least three of (1) loop error events, (2) terminal reload events, (3) price change at the terminal events, and (4) item-not-on-file events.

3. A point of sale system, comprising:
    (a) a terminal at a customer checkout location, said terminal having means for reading product codes on product items in a customer's order;
    (b) item record file means for storing price and product identification information for product items;
    (c) a store controller with which said terminal can communicate, said store controller in communication with said item record file; and
    (d) means for collecting and storing system test data, said system test data comprising a log of events including (1) loop error events, (2) terminal reload events, (3) price change at the terminal events, and (4) item-not-on-file events.

4. A point of sale system, comprising:
    (a) a terminal at a customer checkout location, said terminal having means for reading product codes on product items in a customer's order;
    (b) item record file means for storing price and product identification information for product items;
    (c) a store controller with which said terminal can communicate, said store controller in communication with said item record file; and
    (d) means for collecting and storing system test data, said system test data comprising a log of events including at least one of (1) loop error events, (2) terminal reload events, (3) price change at the terminal events, and (4) item-not-on-file events.

5. A system according to claim 4 further comprising means for collecting and storing credit provider authorization time-out data, said time-out data comprising an amount of time-outs received during electronic tendering transactions.

6. A system according to claim 4 further comprising means for collecting and storing credit provider authorization time-out data, said time-out data comprising an amount of time-outs received during electronic tendering transactions, wherein said tendering transactions each involve an electronic request for authorization for credit from a credit provider.

7. A system according to claim 4 further comprising means for uniquely identifying the customer based upon a scannable identification card.

8. A system according to claim 4 further comprising a scanner for electronically, magnetically, or optically reading information.

9. A system according to claim 4 further comprising customer purchase file means for storing data pertaining to the customer's purchase of products.

10. A system according to claim 4 further comprising means for automatically generating data defining a discount coupon.

11. A system according to claim 4 further comprising means for generating said coupon in response to a coupon signal indicating that a customer's order meets conditions of a discount deal.

12. A system according to claim 11 wherein said coupon signal is generated in response to a tender signal indicating purchase of said customer's order.

13. A system according to claim 4 further comprising means for printing a discount coupon.

14. A system according to claim 4 further comprising means for printing a discount coupon at the terminal.

15. A system according to claim 4 further comprising a remote host computer for processing data and generating reports and a remote database for storing data, said remote database in communication with said remote host computer, and means for placing said remote host computer in communication with said store controller for transmitting data captured at said terminal to said remote host computer.

16. A system according to claim 4 wherein said store controller comprises means for performing a filter process for determining selected customer purchase data.

17. A process comprising the steps of:
    (a) reading product codes on product items in a customer's order using a terminal at a customer checkout location;
    (b) storing price and product identification information for product items in an item record file;
    (c) transmitting price and product identification information from the item record file to an store controller;
    (d) transmitting customer purchase data from said terminal to said store controller; and
    (e) collecting and storing system test data, said system test data comprising a log of events including at least two of (1) loop error events, (2) terminal reload events, (3) price change at the terminal events, and (4) item-not-on-file events.

18. A process comprising the steps of:
(a) reading product codes on product items in a customer's order using a terminal at a customer checkout location;
(b) storing price and product identification information for product items in an item record file;
(c) transmitting price and product identification information from the item record file to an store controller;
(d) transmitting customer purchase data from said terminal to said store controller; and
(e) collecting and storing system test data, said system test data comprising a log of events including at least three of (1) loop error events, (2) terminal reload events, (3) price change at the terminal events, and (4) item-not-on-file events.

19. A process comprising the steps of:
(a) reading product codes on product items in a customer's order using a terminal at a customer checkout location;
(b) storing price and product identification information for product items in an item record file;
(c) transmitting price and product identification information from the item record file to an store controller;
(d) transmitting customer purchase data from said terminal to said store controller; and
(e) collecting and storing system test data, said system test data comprising a log of events including (1) loop error events, (2) terminal reload events, (3) price change at the terminal events, and (4) item-not-on-file events.

20. A process comprising the steps of:
(a) reading product codes on product items in a customer's order using a terminal at a customer checkout location;
(b) storing price and product identification information for product items in an item record file;
(c) transmitting price and product identification information from the item record file to an store controller;
(d) transmitting customer purchase data from said terminal to said store controller; and
(e) collecting and storing system test data, said system test data comprising a log of events including at least one of (1) loop error events, (2) terminal reload events, (3) price change at the terminal events, and (4) item-not-on-file events.

21. A process according to claim 20 further comprising the step of collecting and storing credit provider authorization time-out data, said time-out data comprising an amount of time-outs received during electronic tendering transactions.

22. A process according to claim 20 further comprising the step of uniquely identifying the customer based upon a scannable identification card.

23. A process according to claim 20 wherein said reading comprises electronic, magnetic or optical scanning.

24. A process according to claim 20 further comprising the step of storing data pertaining to the customer's purchase of products.

25. A process according to claim 20 further comprising the step of generating data defining a discount coupon.

26. A process according to claim 25 wherein said step of generating is in response to a tender signal.

27. A process according to claim 20 further comprising the step of generating a coupon in response to a coupon signal indicating that a customer's order meets conditions of a discount deal.

28. A process according to claim 20 further comprising the step of transmitting data captured at said terminal from the store controller to a remote host computer.

29. A system according to claim 20 further comprising the step of filtering thereby determining selected customer purchase data.

* * * * *

UNITED STATES PATENT AND TRADEMARK OFFICE
CERTIFICATE OF CORRECTION

PATENT NO. : 6,795,809 B2
DATED : September 21, 2004
INVENTOR(S) : Michael O'Brien et al.

It is certified that error appears in the above-identified patent and that said Letters Patent is hereby corrected as shown below:

Title page,
Item [63], Related U.S. Application Data, reading
"Continuation of application No. 08/417,064, filed on Apr. 3, 1995, now Pat. No. 5,832,457, which is a continuation-in-part of application No. 08/088,617, filed on Jul. 6, 1993, now abandoned, which is a continuation of application No. 07/695,650, filed on May 6, 1991, now abandoned."

should read

--Continuation of application Ser. No. 08/417,064, filed Apr. 3, 1995, now U.S. Pat. No. 5,832,457 which is a continuation-in-part of: (1) application Ser. No. 08/088,617, filed Jul. 6, 1993, now abandoned, which is a continuation of application Ser. No. 07/695,650, filed May 6, 1991, now abandoned and (2) application Ser. No. 07/960,517, filed Oct. 9, 1992, now abandoned.--

Column 1,
Line 3, replace "U.S. Pat. No. 5,582,487" by -- U.S. Pat. No. 5,582,457 --

Signed and Sealed this

Eighteenth Day of January, 2005

JON W. DUDAS
*Director of the United States Patent and Trademark Office*